United States Patent [19]

Wyles et al.

[11] Patent Number: 5,083,016

[45] Date of Patent: Jan. 21, 1992

[54] 3-TRANSISTOR SOURCE FOLLOWER-PER-DETECTOR UNIT CELL FOR 2-DIMENSIONAL FOCAL PLANE ARRAYS

[75] Inventors: Richard H. Wyles, Cardiff; David Madajian, Carlsbad, both of Calif.

[73] Assignee: Hughes Aircraft Company, Los Angeles, Calif.

[21] Appl. No.: 500,819

[22] Filed: Mar. 27, 1990

[51] Int. Cl.⁵ .......................................... H01J 40/14
[52] U.S. Cl. .......................... 250/208.1; 358/213.28
[58] Field of Search ............ 250/208.1, 211 J, 211 R; 358/213.12, 213.28, 213.29, 213.31

[56] References Cited

U.S. PATENT DOCUMENTS

| | | | |
|---|---|---|---|
| 4,107,474 | 8/1978 | Schneider | 179/18 |
| 4,274,113 | 6/1981 | Ohba et al. | 358/212 |
| 4,385,321 | 5/1983 | Malm | 358/213 |
| 4,390,791 | 6/1983 | Hatanaka et al. | 250/578 |
| 4,445,117 | 4/1984 | Gaalema et al. | 340/825.91 |
| 4,583,002 | 4/1986 | Kondo et al. | 250/208.1 |
| 4,808,822 | 2/1989 | Manning et al. | 250/208.1 |

OTHER PUBLICATIONS

F. Andoh et al., "A 250,000-Pixel Image Sensor with FET Amplification at Each Pixel for High-Speed Television Cameras", 1990 IEEE International Solid-State Circuits Conference Feb. 1990.

*Primary Examiner*—David C. Nelms
*Assistant Examiner*—K. Shami
*Attorney, Agent, or Firm*—W. C. Schubert; W. K. Denson-Low

[57] ABSTRACT

A Source-Follower-per-Detector (SFD) unit cell [12'], a two dimensional array [30] of same and a method of operating the two dimensional array. Each unit cell is constructed with but three transistors [14, 16, 22] and is coupled to an associated radiation detector [10] for receiving an output signal therefrom. A method includes a first step of (a) reading out a first row (N) of unit cells by asserting a first row enable signal for causing each of the unit cells of the row (N) to impress an electrical signal onto an associated output signal line. The electrical signal has a magnitude that is a function of the associated detector output signal. The method includes an additional step of (b) simultaneously resetting another row of unit cells each of which has a reset input coupled to and responsive to the assertion of the first row enable signal line.

17 Claims, 2 Drawing Sheets

3-TRANSISTOR SOURCE FOLLOWER-PER-DETECTOR UNIT CELL FOR 2-DIMENSIONAL FOCAL PLANE ARRAYS

FIELD OF THE INVENTION

This invention is related generally to radiation detector circuitry and, in particular, to an improved source follower unit cell for a radiation detector, the improved unit cell being constructed with three transistor devices.

BACKGROUND OF THE INVENTION

Commonly assigned U.S. Pat. No. 4,445,117, issued on Apr. 24, 1984, entitled "Transistorized Focal Plane Having Floating Gate Output Nodes", by Steven D. Gaalema and Michael D. Jack discloses a readout circuit having a source-follower-per-detector (SFD) configuration. The disclosed implementation requires that each unit cell of a radiation detecting array have four transistors, one of which is coupled to a reset clock (-RST) control signal input. Although this implementation provides a satisfactory solution for many applications there are some applications where it becomes necessary to significantly impact the design of a readout device in order to incorporate these features. As a result circuit performance and/or producibility may be adversely impacted. Specifically, it has been found necessary in order to accommodate the four transistor circuit disclosed in U.S. Pat. No. 4,445,117 to design Schottky infrared detector readout devices to include unit cell pairs comprised of unit cells that are mirror images of one another. However, the use of mirrored unit cells has also been found to cause a problem relating to odd/even signal nonuniformities, thereby adversely impacting readout performance. The odd/even signal nonuniformity is an artifact of the unit cell array layout and manifests itself as a detectable signal difference between unit cells disposed in odd and in even rows, and in odd and in even columns.

It is thus an object of the invention to improve on the four transistor unit cell SFD readout circuit by requiring only three transistors in each unit cell and by eliminating requirement for a reset clock.

It is a further object of the invention to provide a three transistor unit cell SFD readout circuit that beneficially eliminates odd/even nonuniformity problems encountered with Schottky readout arrays.

SUMMARY OF THE INVENTION

The foregoing problems are overcome and the objects of the invention are realized by a readout unit cell circuit for coupling to a radiation detector. The unit cell includes a node having a capacitance associated therewith, the node being coupled to a radiation detector for storing charge generated by the detector. A first switching circuit is coupled to the node and is responsive to an assertion of an enabling signal for periodically impressing an electrical signal onto an output signal line, the electrical signal having a magnitude that is a function of the charge stored by the capacitance. The unit cell further includes a second switching circuit coupled to the node for periodically resetting the node to a predetermined signal level. In accordance with the invention the second switching circuit is comprised of a single transistor that provides a unit cell having but three transistor devices as opposed to the four devices of the prior art.

The unit cell is one of a plurality of unit cells organized into at least two groups, such as two rows, wherein each group contains a plurality of unit cells that are each coupled in common to an associated enabling signal. The second switching circuit is coupled to and is responsive to the assertion of an enabling signal associated with another group of unit cells.

Further in accordance with the invention there is provided an array and a method of operating a two dimensional array of unit cells organized as rows and columns of unit cells. Each unit cell of the array is coupled to an associated radiation detector for receiving an output signal therefrom. The method includes a first step of (a) reading out a first row (N) of unit cells by asserting a first row enable signal for causing each of the unit cells of the row (N) to impress an electrical signal onto an associated output signal line. The electrical signal has a magnitude that is a function of the associated detector output signal. The method includes an additional step of (b) simultaneously resetting another row of unit cells each of which has a reset input coupled to and responsive to the assertion of the first row enable signal line.

In one embodiment the step of simultaneously resetting resets a physically adjacent row of unit cells that was previously read out. In another embodiment of the invention the step of simultaneously resetting resets a physically nonadjacent row of unit cells that was previously read out. By example, the rows may be read out in an interlaced fashion such as by sequentially reading out the even rows and then sequentially reading out the odd rows. In this case a given even row (N) is reset by the assertion of the row enable signal for the next consecutive even row (N+2). Correspondingly a given odd row (N+1) is reset by the assertion of the row enable signal for the next consecutive odd row (N+3).

There are several advantages provided by the teaching of the invention. As a first example, a reduction in the number of transistors per unit cell provides additional area within the unit cell. This additional area can be exploited in a number of ways, depending upon the specific application. Another advantage provided by the invention is the elimination of the φRST signal required to operate the conventional SFD circuit. In addition to simplifying the timing signal generation requirements and operation of the readout circuitry the elimination of this discrete reset signal further improves the layout of the unit cell and the array of unit cells. Specifically, the teaching of the invention optimizes the layout of a high-density Schottky readout array in order to eliminate odd/even nonuniformity problems.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF PREFERRED EMBODIMENTS OF THE INVENTION

The four transistor SFD unit cell disclosed in U.S. Pat. No. 4,445,117 is illustrated in the simplified schematic diagram of FIG. 1. The disclosure of U.S. Pat. No. 4,445,117 is incorporated herein by reference in its entirety.

Figure 1:
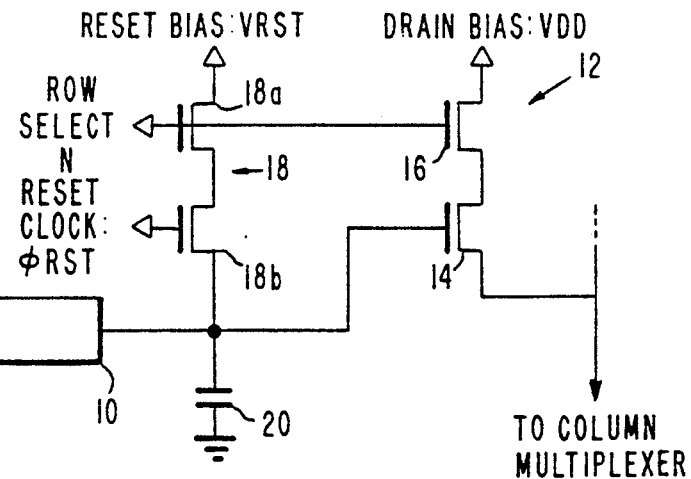
FIG. 1 is simplified schematic diagram of a four transistor SFD circuit of the prior art.

In FIG. 1 each detector 10 is connected to a transistorized output circuit 12 formed on a common substrate therewith. The output circuit 12 includes a source follower metal oxide semiconductor transistor (MOSFET) 14, an enable MOSFET 16 and a dual gate reset MOSFET 18, comprised of transistors 18a and 18b. The drain of the enable transistor 16 is connected to a Drain Bias signal VDD and the source of the enable transistor 16 is connected to the drain of the source follower 14. The source of the source follower transistor 14 is connected to a column output line and to a column multiplexer (not shown in FIG. 1). The gate of the source follower transistor 14 is connected to the output of the photodetector 10 and is also connected through the reset transistors 18a and 18b to a Reset Bias signal VRST. The gate of reset transistor 18b is connected to a reset clock signal ($\phi$RST) while the gate of reset transistor 18a is connected to a Row N Select or enable signal.

In operation the gate of the source follower transistor 14 accumulates on a capacitance 20 the charge that is sourced by the detector 10 in response to an incident photon flux. The charge that accumulates determines the source voltage of the source follower transistor 14. The capacitance 20 may be a specifically formed capacitor or may represent the associated node capacitance.

The gate of the source follower transistor 14 comprises a floating output node that is periodically reset by the action of reset transistors 18a and 18b. That is, the floating node is periodically reset in synchronism with the application of both the $\phi$RST and Row Select N signals.

Each of the Row Select N signals of the array is connected to receive a different row enable clock signal so that the array is row addressable, each of the column output lines carrying an output voltage representing the output signal of the corresponding detectors in the selected row.

Figure 2:
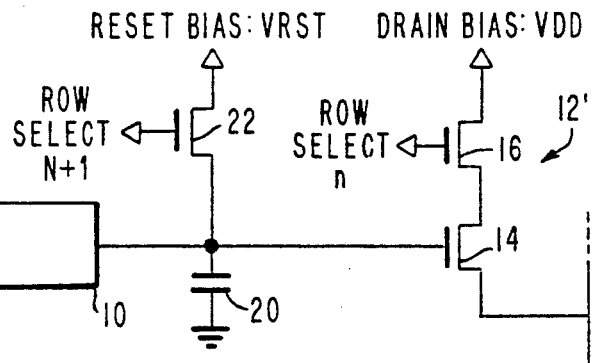
FIG. 2 is a simplified schematic diagram illustrating a presently preferred embodiment of a three transistor SFD circuit.

Considering now the improved SFD circuit depicted in FIG. 2, wherein corresponding devices are numbered the same as in FIG. 1, it can readily be seen that the output circuit 12' employs a single transistor 22 to perform the reset function. The gate of transistor 22, which controls the transistor on/off state, is connected to a row enable line of a next row to be addressed and not the currently addressed row. Thus, when a particular row (N) is addressed to be read out, the previously addressed row (N−1) is reset. An entire row of unit cells is thus simultaneously reset. As such the use of the invention is applicable for those applications allowing row-by-row reset, as opposed to pixel-by-pixel reset.

The simplification in circuitry is readily apparent when comparing the presently preferred circuit of FIG. 2 to the conventional circuit of FIG. 1. To perform the reset operation with the conventional circuit requires an additional transistor and an additional control input ($\phi$RST) which must be routed into every unit cell of the array.

Figure 3:
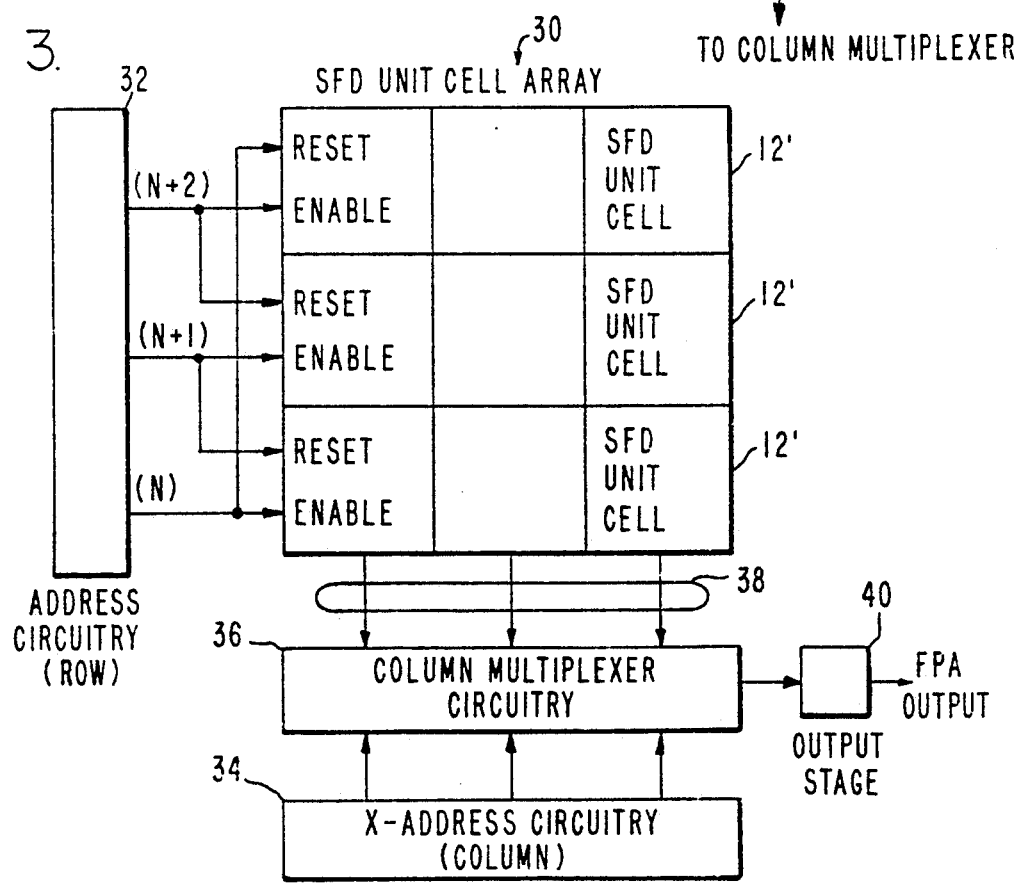
FIG. 3 is block diagram illustrating a SFD readout array incorporating the three transistor SFD unit cell of the invention.

FIG. 3 is a simplified block diagram illustrating a first embodiment of a SFD readout array 30 that incorporates a two dimensional array having y-rows and x-columns of three transistor SFD unit cells 12'. It should be realized that a typical array could comprise fewer than nine and will typically comprise a larger number of unit cells than the nine depicted in FIG. 3. By example, the array may comprise 1024 unit cells arranged as 32 rows by 32 columns. Furthermore, there is no requirement that the number of rows equal the number of columns.

Each of the unit cells 12' is coupled to an associated radiation detector (not shown) for receiving and buffering charge sourced by the associated detector. Array 30 readout circuitry includes a y-address generator 32, an x-address generator 34 and a column multiplexer 36 coupled to a plurality of column output bus lines 38, individual ones of which are coupled in common to all of the SFD unit cells 12' of a particular one of the x-columns. An output stage 40 buffers the output of multiplexer 36 to provide a Focal Plane Array (FPA) output to signal processing circuitry (not shown).

As can be seen, a row enable signal for a particular row (N) is also coupled to a reset input of a row that is read immediately before the row (N), in this case the row (N+2). Similarly, a row enable signal for the row (N+1) is also coupled to a reset input of the row that is read immediately before the row (N+1), in this case the row (N).

Figure 4:
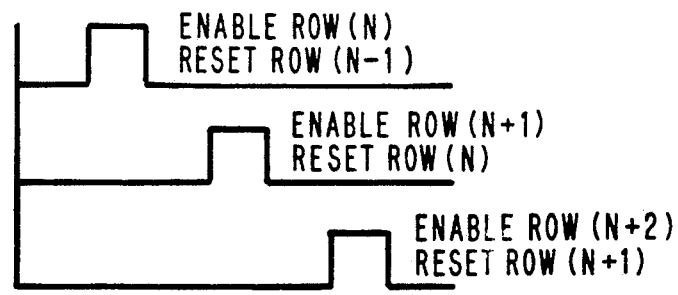
FIG. 4 is a simplified timing diagram showing the application of row enable signals to a unit cell array, wherein it can be seen that an application of a row enable signal for a SFD row (N+1) simultaneously resets the unit cells of the SFD row read out previously, specifically the SFD row (N)

FIG. 4 is a simplified timing diagram showing the sequential application of the row enable signals to the unit cell array 30. By example, it can be seen that an application of the row enable signal for the SFD row (N+1) simultaneously resets the unit cells of the SFD row read out previously, specifically the SFD row (N).

Figure 5:
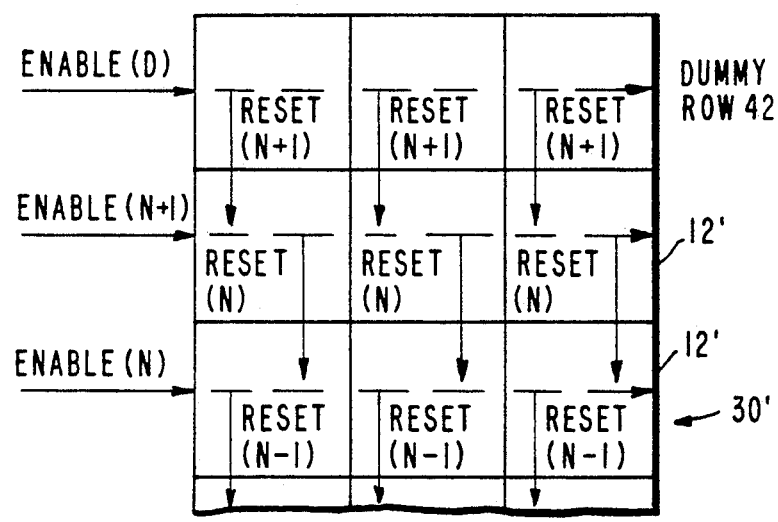
FIG. 5 is a block diagram illustrating a presently preferred unit cell layout and signal routing that provides a nonfunctional, dummy row and row enable signal for resetting the topmost functional row of the array and which further routes the enable signal from each unit cell to the adjacent unit cell in the preceding row.

FIG. 5 is a block diagram that illustrates a presently preferred unit cell array layout and signal routing. This embodiment provides a nonfunctional, dummy row 42 and corresponding row enable signal for resetting the topmost functional row of the array 30'. This scheme eliminates a requirement that the enable signal for the bottom row be wrapped around to reset the top row as in FIG. 3. This embodiment also routes the enable signal from each unit cell to the adjacent unit cell in the preceding row, thereby eliminating the extra signal line bused to each row of the array as illustrated in FIG. 3.

Figure 6:
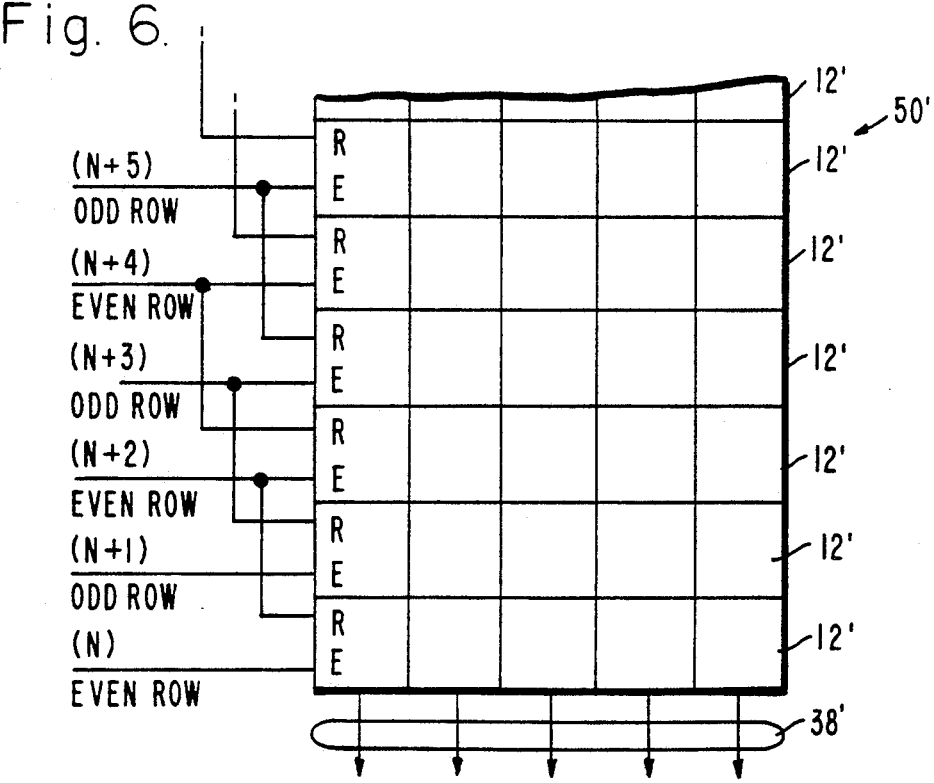
FIG. 6 illustrates a further embodiment of the invention wherein the array of unit cells is readout in an interlaced fashion by first sequentially reading out all even rows and then sequentially reading out all odd rows.

FIG. 6 illustrates a further embodiment of the invention wherein an array 50 of three transistor unit cells 12' is readout in an interlaced fashion by first sequentially reading out all even rows and then sequentially reading out all odd rows. For example, even rows (N), (N+2), (N+4), (etc.) are first sequentially readout. Next, the odd rows (N+1), (N+3), (N+5), (etc.) are readout. This embodiment illustrates that the invention does not require that a given enable line be coupled only to a physically adjacent row of unit cells for resetting the physically adjacent row. Instead, the invention provides that a given enable line be coupled to a row that is readout prior to the given row, and not necessarily to a physically adjacent row. If a three-way or a four-way interleave of rows were desired instead of the two-way interleave depicted in FIG. 6 then corresponding changes are made to the connection of the respective enable lines. Of course, it may be desirable for the embodiment of FIG. 6 to couple the enable signals interiorly within the array 50, as depicted in FIG. 5, instead of providing the separate reset signal busses as shown in FIG. 6.

There are several advantages associated with the teaching of the invention. As a first example, the reduction in the number of transistors per unit cell provides additional area within the unit cell. This additional area can be exploited in a number of ways, depending upon the specific application. For example, transistor size can be varied, circuitry can be added to modify detector input circuit performance, the node capacitance 20 can be made larger for those applications benefiting from a larger capacitance value and/or an optimally reproducible circuit layout can be provided. Another advantage conferred by the practice of the invention is the elimination of the $\phi$RST signal required to operate the conventional SFD circuit. In addition to simplifying the timing signal generation requirements and operation of the readout circuitry the elimination of the discrete reset signal further improves the layout of the unit cell, it being remembered that in the conventional array this signal was required to be routed to every unit cell of the array. Specifically, the teaching of the invention optimizes the layout of a high-density Schottky readout array by eliminating a requirement for mirror-image pairs of unit cells, thereby also eliminating odd/even signal nonuniformity problems.

With the exception of the aspects of circuit operation relating to the novel reset technique other aspects of the operation of the circuit of FIG. 2 are identical to the conventional four transistor SFD circuit as disclosed in U.S. Pat. No. 4,445,117, previously incorporated herein by reference.

It should be noted that it is within the scope of the invention to provide the SFD unit cells in a monolithic fashion with the radiation detectors, that is integrated upon a common substrate therewith, or to provide the SFD unit cells separately. If provided separately an array of SFD unit cells may be hybridized with an array of radiation detectors by well-known coupling techniques, such as by coupling the SFD unit cell array to the photodetector array through a plurality of indium bumps. As such, and while the invention has been particularly shown and described with respect to preferred embodiments thereof, it will be understood by those skilled in the art that changes in form and details may be made therein without departing from the scope and spirit of the invention.

What is claimed is:

1. A readout unit cell circuit for coupling to a radiation detector, comprising:
    a node having a capacitance associated therewith, the node being coupled to a radiation detector for storing charge generated by the detector;
    first switching means coupled to the node and responsive to an assertion of an enabling signal for periodically impressing an electrical signal onto an output signal line, the electrical signal having a magnitude that is a function of the charge stored by the capacitance; and
    second switching means coupled to the node for periodically resetting the node to a predetermined signal level; wherein
    the unit cell is one of a plurality of unit cells organized into at least two groups, wherein each group contains a plurality of unit cells that are each coupled in common to an associated enabling signal, and wherein the second switching means is coupled to and is responsive to the assertion of an enabling signal associated with another group of unit cells.

2. A readout unit cell circuit as set forth in claim 1 wherein the first switching means is comprised of a first transistor means and a second transistor means and wherein the second switching means is comprised of a third transistor means.

3. A readout unit cell circuit as set forth in claim 1 wherein the unit cell is disposed in a row (N) of a two dimensional array of unit cells, and wherein the second switching means is coupled to and is responsive to the assertion of an enabling signal associated with a physically adjacent row (N+1).

4. A readout unit cell circuit as set forth in claim 1 wherein the unit cell is disposed in a row (N) of a two dimensional array of unit cells, and wherein the second switching means is coupled to and is responsive to the assertion of an enabling signal associated with a physically nonadjacent row (N+m), where m is an integer greater than one.

5. A readout unit cell as set forth in claim 1 wherein the plurality of unit cells are provided on a common substrate with a plurality of radiation detectors.

6. A readout unit cell as set forth in claim 1 wherein the plurality of unit cells are provided on a first substrate and wherein a plurality of radiation detectors are provided on a second substrate.

7. A method of operating a two dimensional array of unit cells organized as rows and columns of unit cells, each unit cell being coupled to an associated radiation detector for receiving an output signal therefrom, comprising the steps of:
    reading out a first row (N) of unit cells by asserting a first row enable signal for causing each of the unit cells of the row (N) to impress an electrical signal onto an associated output signal line, the electrical signal having a magnitude that is a function of the associated detector output signal; and
    simultaneously resetting another row of unit cells each of which has a reset input coupled to and responsive to the assertion of the first row enable signal.

8. A method as set forth in claim 7 wherein the step of simultaneously resetting resets a physically adjacent row of unit cells that was previously read out.

9. A method as set forth in claim 7 wherein the step of simultaneously resetting resets a physically nonadjacent row of unit cells that was previously read out.

10. A two dimensional array of unit cells organized as rows and columns of unit cells, each unit cell being coupled to an associated radiation detector means for receiving an output signal therefrom, comprising:
    means for reading out a first row (N) of unit cells including means for asserting a first row enable signal for causing each of the unit cells of the row (N) to impress an electrical signal onto an associated output signal line, the electrical signal having a magnitude that is a function of the associated radiation detector means output signal; and means associated with each unit cell of a second row of unit cells for resetting the second row of unit cells to a predetermined signal condition, each of the unit cell resetting means having a reset input coupled to and responsive to the assertion of the first row enable signal line.

11. A two dimensional array of unit cells as set forth in claim 10 wherein each unit cells comprises:

a node having a capacitance associated therewith, the node being coupled to the associated radiation detector for storing charge generated by the detector;

wherein the means for reading out is comprised of first switching means coupled to the node and responsive to an assertion of an associated row enable signal for periodically impressing the electrical signal onto the associated output signal line; and wherein the means for resetting is comprised of second switching means coupled to the node for periodically resetting the node to the predetermined signal condition.

12. A two dimensional array of unit cells as set forth in claim 11 wherein the first switching means is comprised of a first transistor means and a second transistor means and wherein the second switching means is comprised of a third transistor means.

13. A two dimensional array of unit cells as set forth in claim 11 wherein the unit cell is disposed in the row (N) and wherein the second switching means is coupled to and is responsive to the assertion of the row enable signal associated with a physically adjacent row (N+1).

14. A two dimensional array of unit cells as set forth in claim 11 wherein the unit cell is disposed in the row (N) and wherein the second switching means is coupled to and is responsive to the assertion of a row enable signal associated with a physically nonadjacent row (N+m), where m is an integer greater than one.

15. A two dimensional array of unit cells as set forth in claim 11 wherein the rows are sequentially read out in an interlaced manner as even rows followed by odd rows and wherein the unit cell is disposed in the even row (N) and wherein the second switching means is coupled to and is responsive to the assertion of a row enable signal associated with a physically nonadjacent even row (N+2).

16. A two dimensional array of unit cells as set forth in claim 10 wherein the two dimensional array of unit cells is provided on a common substrate with a plurality of radiation detectors.

17. A two dimensional array of unit cells as set forth in claim 10 wherein the two dimensional array of unit cells is provided on a first substrate and wherein a plurality of radiation detectors are provided on a second substrate.

* * * * *